A. WHITE.
Stove Window.
No. 104,911. Patented June 28, 1870.
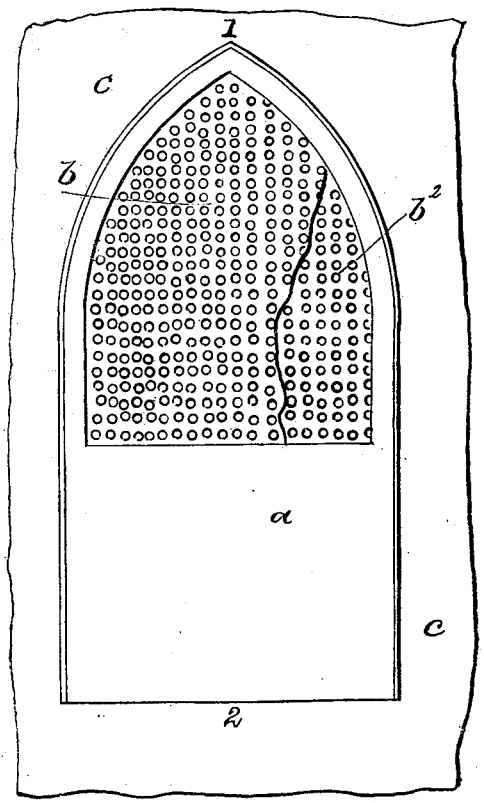
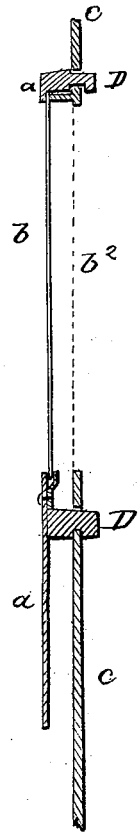
Witnesses
Chas Jacobs
J. C. Wilchman
Inventor
A. White
Per
B. H. Alexander
Atty

UNITED STATES PATENT OFFICE.

ALEXANDER WHITE, OF GENESEO, ILLINOIS.

WINDOW FOR COAL-STOVES.

Specification forming part of Letters Patent No. 104,911, dated June 28, 1870.

*To all whom it may concern:*

Be it known that I, ALEXANDER WHITE, of the city of Geneseo, in the county of Henry, in the State of Illinois, have invented a new and Improved Mode of Illuminating Coal-Stoves; and I do hereby declare that the following is a full and exact description thereof, reference being had to the accompanying drawings and the letters of reference thereon.

The nature of my invention consists in constructing an illuminator for coal-stoves in such a manner as to produce a current of heated air passing behind the mica or glass and through small openings into the stove, thereby carrying the smoke away from the mica or glass.

To enable others skilled in the art to make and use my invention, I will proceed to describe its construction and operation.

The illuminating-opening of mica plate may be constructed in any desired form or style.

Figure 1 is a perspective view; and Fig. 2 is a transverse section of Fig. 1, cut through on the line 1 2.

$a$ is a plate containing the opening $b$ for the mica and extending downward near the outer shell of the stove a sufficient distance to produce a draft and at the same time heat the air as it passes through this narrow aperture before it passes into the stove. This air-current is indicated by arrows.

$b$ is the mica or glass plate giving the illumination.

$b^2$ is a perforated opening in the shell of the stove, directly behind the mica, and of corresponding size and shape. This opening may be simply a perforation consisting of numerous small holes of any desired shape or style; or it may consist of longitudinal openings of fine grating, or in any other form that will tend to distribute the air over its entire surface while passing into the stove.

$c$ is the shell of the stove, which may have the openings for the illumination made in the same piece and of the same material, or it may simply have an opening of the desired form and size, and the piece forming the miniature openings may be made of any metallic substance that will stand the heat and be attached to the plate of stove $c$, as may be desired.

The plate or mica-frame $a$ may be attached to the stove by means of notched lugs $d\ d$; or it may be attached by means of screw-bolts or rivets, as may seem desirable. The space between the plate $a$ and the shell of the stove $c$ should be from one-fourth to three-eighths of an inch in depth and the full width of the mica plate. The air enters in at the bottom of plate $a$, and while passing between the plate $a$ and the stove $c$ it becomes rarefied and heated, and consequently does not interfere in the least with the ordinary draft of the stove, but passes constantly through the perforation and carries away with it the smoke that otherwise would blacken the mica or glass.

What I claim as my invention, and desire to secure by Letters Patent, is—

1. The plate $a$, extending below the mica, and so formed as to leave a passage between it and the shell of the stove or mica plate, thus producing a strong draft and heating the current of air before it reaches the perforated plate, substantially as described.

2. In combination with the plate $a$, the perforated opening $b^2$ and mica $b$, all arranged and operating substantially as and for the purpose set forth.

In testimony that I claim the foregoing as my own I affix my signature in presence of two witnesses.

ALEXANDER WHITE.

Witnesses:
C. E. HAWLEY,
R. F. STEELE.